United States Patent
Lee et al.

(10) Patent No.: US 11,031,186 B2
(45) Date of Patent: Jun. 8, 2021

(54) CAPACITOR COMPONENT

(71) Applicant: SAMSUNG ELECTRO-MECHANICS CO., LTD., Suwon-si, Gyeonggi-do (KR)

(72) Inventors: Taek Jung Lee, Suwon-si (KR); Jin Kyung Joo, Suwon-si (KR); Hyo Youn Lee, Suwon-si (KR); Won Young Lee, Suwon-si (KR); Sung Kwon An, Suwon-si (KR); Jae Yeol Choi, Suwon-si (KR); Jin Man Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/273,324

(22) Filed: Feb. 12, 2019

(65) Prior Publication Data
US 2019/0172648 A1 Jun. 6, 2019

Related U.S. Application Data

(63) Continuation of application No. 15/487,997, filed on Apr. 14, 2017, now Pat. No. 10,373,760.

(30) Foreign Application Priority Data

Sep. 5, 2016 (KR) .................. 10-2016-0113880

(51) Int. Cl.
*H01G 4/012* (2006.01)
*H01G 4/30* (2006.01)
(Continued)

(52) U.S. Cl.
CPC .............. *H01G 4/30* (2013.01); *H01G 4/012* (2013.01); *H01G 4/232* (2013.01); *H01G 4/236* (2013.01); *H01G 4/38* (2013.01)

(58) Field of Classification Search
CPC .......... H01G 4/242; H01G 4/228; H01G 4/30; H01G 4/236; H01G 4/38; H01G 4/012; H01G 4/232
(Continued)

(56) References Cited

U.S. PATENT DOCUMENTS

| 6,310,759 B2 * | 10/2001 | Ishigaki ................. H01G 4/232 361/309 |
| 2002/0158307 A1 * | 10/2002 | Honda ..................... H01G 4/30 257/532 |

(Continued)

FOREIGN PATENT DOCUMENTS

| JP | 2004-207747 A | 7/2004 |
| JP | 2006-100422 A | 4/2006 |

(Continued)

OTHER PUBLICATIONS

Final Office Action issued in corresponding U.S. Appl. No. 15/487,997 dated Nov. 28, 2018.
(Continued)

*Primary Examiner* — Arun Ramaswamy
(74) *Attorney, Agent, or Firm* — Morgan, Lewis & Bockius LLP (57) ABSTRACT

A capacitor component includes a plurality of unit laminates, each comprising a body with a stacked structure including a plurality of internal electrodes and connection electrodes that extend in a stacking direction of the body and electrically connect to the plurality of internal electrodes, and pad portions between adjacent unit laminates to electrically connect the respective connection electrodes of the unit laminates above and below the pad portions to each other.

18 Claims, 8 Drawing Sheets

(51) Int. Cl.
*H01G 4/232* (2006.01)
*H01G 4/236* (2006.01)
*H01G 4/38* (2006.01)

(58) Field of Classification Search
USPC ... 361/321.1, 321.2, 301.4, 306.3, 307, 328, 361/330
See application file for complete search history.

(56) References Cited

U.S. PATENT DOCUMENTS

| | | | |
|---|---|---|---|
| 2006/0120018 A1* | 6/2006 | Lee | H01G 4/232 361/306.3 |
| 2008/0043400 A1* | 2/2008 | Fukudome | H05K 1/0231 361/301.4 |
| 2009/0141426 A1 | 6/2009 | Hwang | |
| 2012/0018204 A1 | 1/2012 | Sato et al. | |
| 2014/0002952 A1* | 1/2014 | McConnell | B23K 1/203 361/301.4 |
| 2014/0124251 A1 | 5/2014 | Park et al. | |

FOREIGN PATENT DOCUMENTS

| | | |
|---|---|---|
| JP | 2006-222442 A | 8/2006 |
| JP | 4018898 B2 | 12/2007 |
| JP | 2014-96552 A | 5/2014 |

OTHER PUBLICATIONS

Non-Final Office Action issued in corresponding U.S. Appl. No. 15/487,997 dated May 16, 2018.
Office Action issued in corresponding Japanese Patent Application No. 2017-082624 dated Nov. 17, 2020, with English translation.

* cited by examiner

CAPACITOR COMPONENT

CROSS-REFERENCE TO RELATED APPLICATION(S)

This application is the continuation application of U.S. patent application Ser. No. 15/487,997 filed on Apr. 14, 2017, which claims benefit of priority to Korean Patent Application No. 10-2016-0113880 filed on Sep. 5, 2016 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor, a capacitor component, is a chip type condenser mounted on the printed circuit boards of several electronic products such as image display devices, including liquid crystal displays (LCD), plasma display panels (PDP), and the like, as well as computers, smartphones, cellular phones, and the like, serving to charge electricity therein or discharge electricity therefrom. The multilayer ceramic capacitor (MLCC) may be used as a component of various electronic devices due to its advantages such as small size, high capacitance, and ease of mounting.

In order to implement a high capacitance capacitor, the permittivity of the capacitor body material may be increased or the dielectric layers and internal electrodes can be thinned to allow for an increased number.

However, it may be difficult to develop a composition of high-permittivity material and there may be limitations in decreasing the thickness of the dielectric layer. Consequently, the current approaches are limited in their ability to increase capacitance. In order to increase capacitance of the product while satisfying the trend for miniaturization of the capacitor, research into a method of increasing an area of overlap between internal electrodes having different polarities has been required. Further, as the mounting density of the circuit board has increased, an attempt to decrease the mounting area and mounting height of the capacitor has been undertaken.

SUMMARY

An aspect of the present disclosure may provide a capacitor component capable of implementing high capacitance and having excellent electrical connectivity and reliability by decreasing alignment defects between connection electrodes even when a thickness is increased.

According to an aspect of the present disclosure, a capacitor component may comprise a plurality of unit laminates, each including a body with a stacked structure including a plurality of internal electrodes and connection electrodes that extend in a stacking direction of the body and electrically connect to the plurality of internal electrodes The capacitor component may also include a pad portion disposed between adjacent unit laminates among the plurality of unit laminates that electrically connect the respective connection electrodes of the adjacent unit laminates to each other.

The connection electrodes may penetrate through the body.

An area of the pad portion, as viewed from the stacking direction of the body, may be larger than that of the connection electrodes.

The respective areas of the connection electrodes positioned above and below the pad portion, as viewed from the stacking direction of the body, may be different from each other.

The respective central axes of the connection electrodes positioned above and below the pad portion may not coincide with each other.

The connection electrode may be at a side surface of the body.

A side surface of the pad portion may also be at the side surface of the body.

The capacitor component may further include a protective layer covering the connection electrode and the pad portion at the side surface of the body.

The plurality of internal electrodes may include a plurality of first and second internal electrodes alternately stacked with dielectric layers interposed therebetween.

The connection electrodes may include first and second connection electrodes electrically connected to the first and second internal electrodes, respectively.

The second connection electrode may penetrate through the first internal electrode and may not be connected to the first internal electrode.

The pad portion may include a first pad portion connected to the respective first connection electrodes of the unit laminates above and below the first pad portion.

The pad portion may include a second pad portion connected to the respective second connection electrodes of the unit laminates above and below the second pad portion.

The capacitor component may further include first and second external electrodes electrically connected to the first and second connection electrodes, respectively, and on a lower surface of a lowermost unit laminate among the plurality of unit laminates.

The first and second external electrodes may also be on an upper surface of an uppermost unit laminate among the plurality of unit laminates.

The first and second external electrodes may not be on side surfaces, in relation to a stacking direction, of the plurality of unit laminates.

The plurality of unit laminates may include three or more unit laminates.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
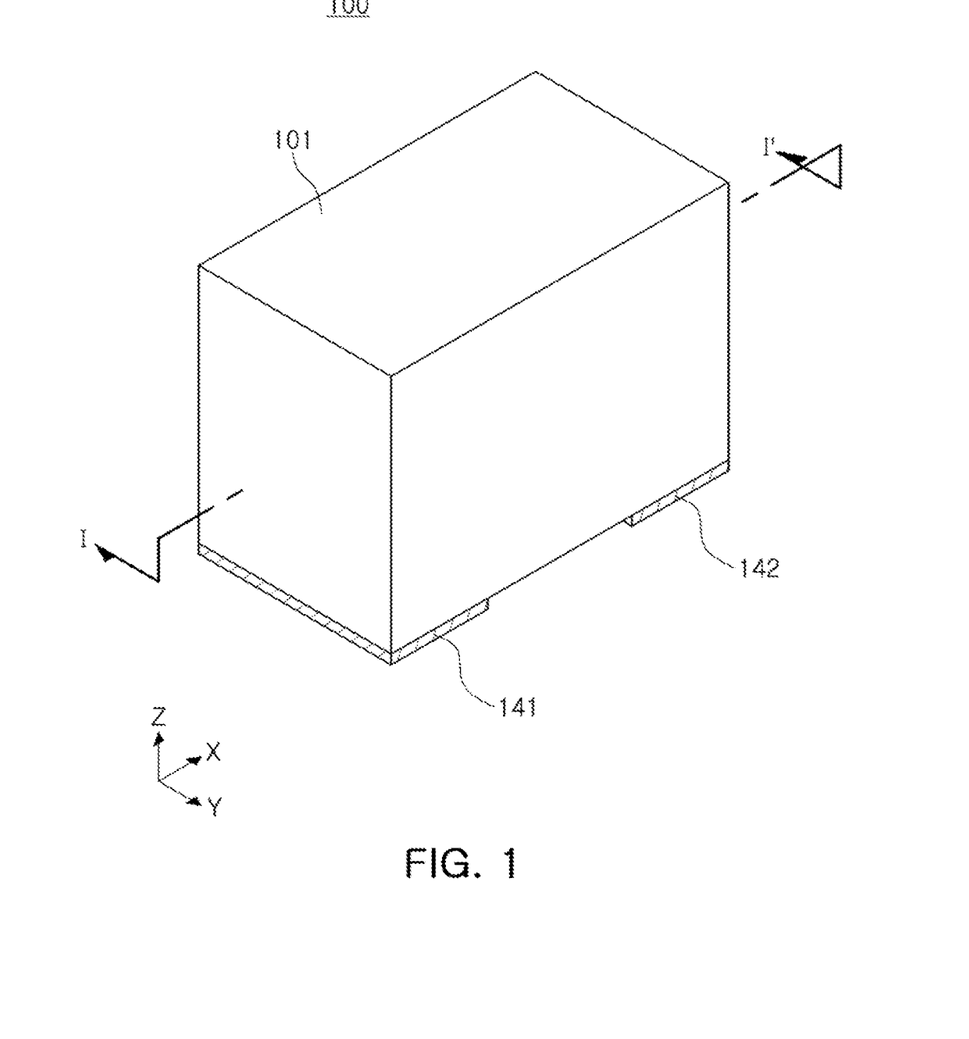
FIG. 1 is a perspective view schematically illustrating a capacitor component according to an exemplary embodiment in the present disclosure.
Figure 2:
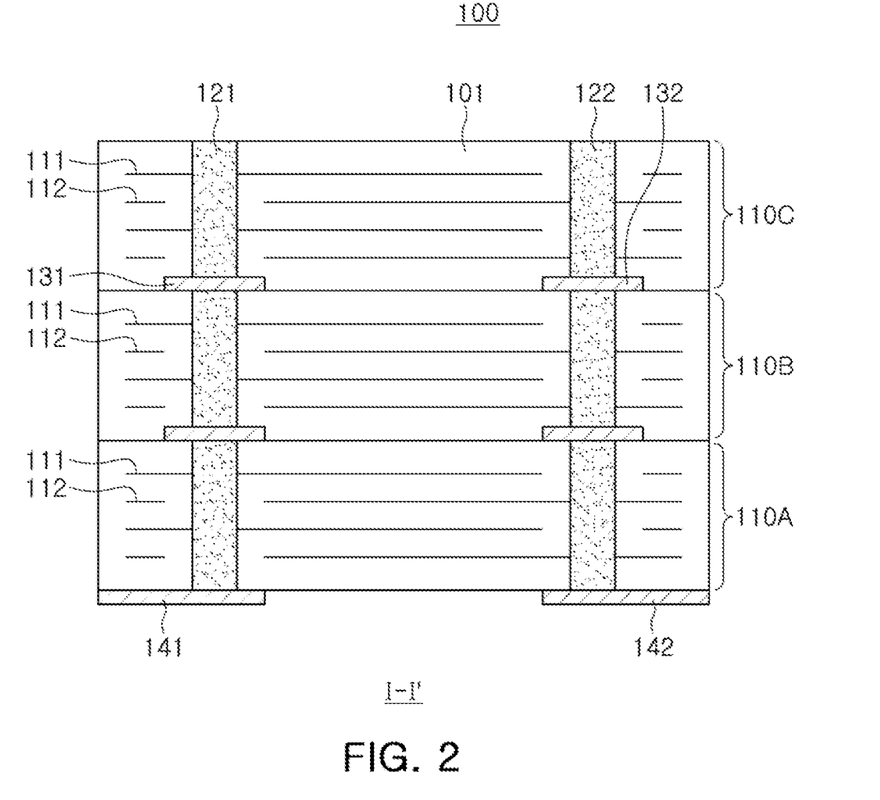
FIG. 2 is a cross-sectional view illustrating the capacitor component of FIG. 1 taken along line I-I' of FIG. 1.
Figure 3:
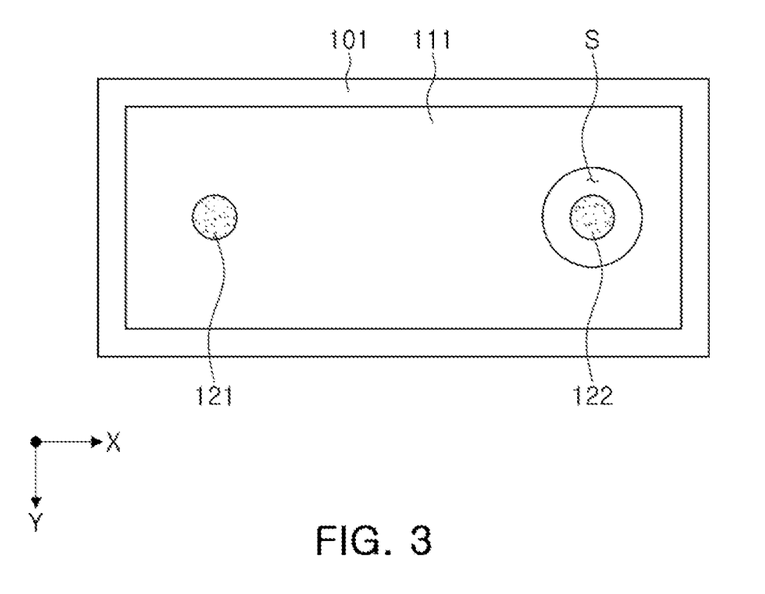
FIG. 3 illustrates shapes of an internal electrode and a connection electrode in the capacitor component of FIG. 1.
Figure 4:
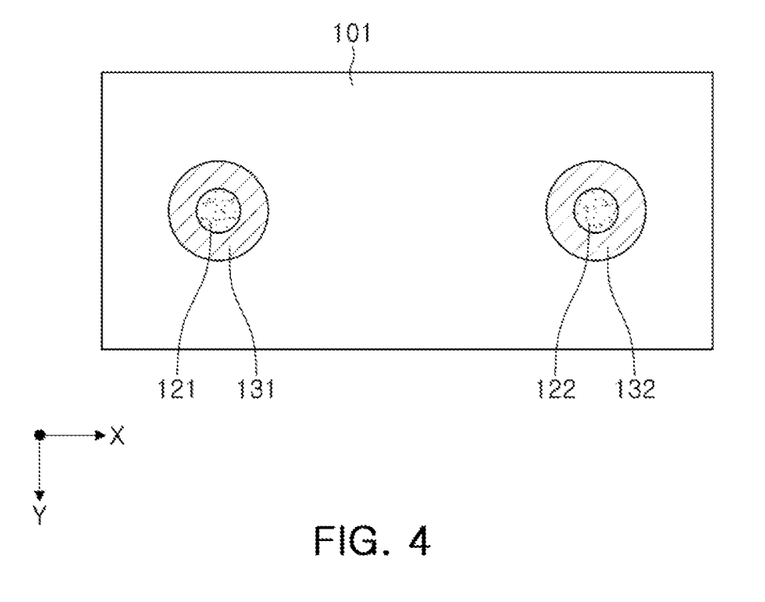
FIG. 4 illustrates shapes of a pad portion and surroundings thereof in the capacitor component of FIG. 1.
Figure 5:
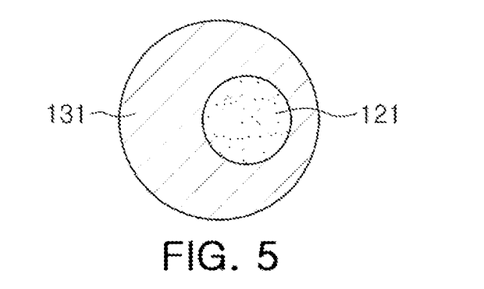
FIGS. 5 through 7 illustrate available connection forms between a pad portion and the connection electrode.
Figure 6:
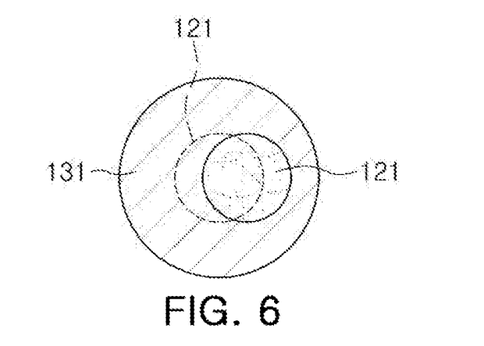
Figure 7:
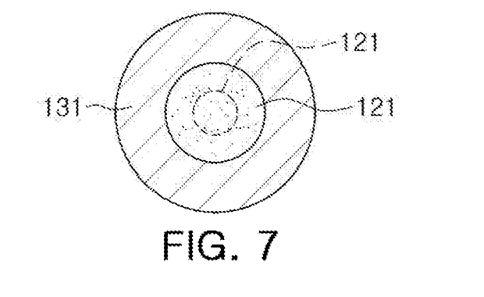

FIG. 1 is a perspective view schematically illustrating a capacitor component according to an exemplary embodiment in the present disclosure. FIG. 2 is a cross-sectional view illustrating the capacitor component of FIG. 1 taken along line I-I' of FIG. 1. FIG. 3 illustrates shapes of an internal electrode and a connection electrode in the capacitor component of FIG. 1. FIG. 4 illustrates shapes of a pad portion and surroundings thereof in the capacitor component of FIG. 1. FIGS. 5 through 7 illustrate available connection forms between a pad portion and the connection electrode.

Referring to FIGS. 1 through 4, a capacitor component 100 according to an exemplary embodiment in the present disclosure may have a structure in which a plurality of unit laminates 110A, 110B, and 110C are stacked, with pad portions 131 and 132 therebetween. The pad portions 131 and 132 may be provided in order to improve electrical connectivity between the unit laminates 110A, 110B, and 110C as described below. First and second external electrodes 141 and 142 may be on a lower portion of the capacitor component 100, for example, on the lower surface of the lowermost unit laminate of the capacitor component 100 among the unit laminates 110A, 110B, and 110C.

According to the present exemplary embodiment, in order to effectively increase capacitance of the capacitor component 100, the unit laminates 110A, 110B, and 110C may be formed and then stacked. In other words, in order to implement high capacitance, a method of separately manufacturing the unit laminates 110A, 110B, and 110C and then stacking the manufactured unit laminates 110A, 110B, and 110C may be used instead of a method of stacking a plurality of dielectric layers and internal electrodes at once to implement a capacitor. Therefore, capacitance of the capacitor component 100 may be effectively increased through an efficient process, and it may be easy to adjust capacitance or a thickness of the capacitor component 100. Although three unit laminates 110A, 110B, and 110C are illustrated in FIG. 2, a larger number of unit laminates may be used in order to obtain higher capacitance.

Each of the unit laminates 110A, 110B, and 110C may include a body 101, a plurality of internal electrodes 111 and 112 disposed in the body 101, and connection electrodes 121 and 122 extended in a stacking direction of the body 101 and connected to the plurality of internal electrodes 111 and 112, respectively. According to the present exemplary embodiment, the plurality of internal electrodes 111 and 112 may be referred to as first and second internal electrodes 111 and 112, respectively, and the connection electrodes 121 and 122 may be referred to as a first connection electrode 121 connected to the first internal electrodes 111 and a second connection electrode 122 connected to the second internal electrodes 112. In addition, a first pad portion 131 may connect the first connection electrodes 121 between the unit laminates 110A, 110B, and 110C, and a second pad portion 132 may connect the second connection electrodes 122 between the unit laminates 110A, 110B, and 110C.

The body 101 may be formed by stacking a plurality of dielectric layers. The dielectric layers may be formed using ceramics, or the like, known in the art. For example, the body 101 may be formed by sintering green sheets containing barium titanate ($BaTiO_3$) based ceramic material, or the like. An example of a barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$. However, the example of the barium titanate ($BaTiO_3$) based ceramic powder is not limited thereto. Another material having high permittivity as well as the barium titanate based ceramic material may also be used. For example, the body 101 may be formed using a strontium titanate ($SrTiO_3$) based material. The body 101 may further contain ceramic additives, organic solvents, plasticizers, binders, dispersants, and the like, if necessary, in addition to the ceramic powders. The dielectric layers obtained by sintering the green sheets may be integrated with each other so that boundaries therebetween are not readily apparent without a scanning electron microscope (SEM).

The first and second internal electrodes 111 and 112 included in each of the unit laminates 110A, 110B, and 110C may have different polarities with each other and be disposed alternately with each other. The first and second internal electrodes 111 and 112 may be formed by printing a conductive paste on ceramic green sheets, or the like. The material of the first and second internal electrodes 111 and 112 may include nickel (Ni), copper (Cu), palladium (pd), or alloys thereof, or the like. The conductive paste may be printed by a screen printing method, a gravure printing method, or the like, but is not limited thereto.

The first and second connection electrodes 121 and 122 may extend in the stacking direction of the body 101 (the Z-axis direction in FIGS. 1 and 2) to thereby be connected to the first and second internal electrodes 111 and 112, respectively, and may be formed to penetrate through the body 101 as illustrated in FIGS. 2 and 3. The through-hole type connection electrodes 121 and 122 as described above may be formed to penetrate through internal electrodes that are not connected thereto among the internal electrodes 111 and 112. For example, as illustrated in FIG. 3, the second connection electrode 122 may penetrate through the first internal electrodes 111 but without being connected to the first internal electrodes 111. An insulating space S may be present between the second connection electrode 122 and the first internal electrode 111. Similarly, the first connection electrode 121 may penetrate through the second internal electrodes 112 but without being connected to the second internal electrodes 112.

The first and second connection electrodes 121 and 122 may be formed by forming holes in the body 101 and the internal electrodes 111 and 112 and filling a conductive material in the holes. This conductive material may be filled by applying a conductive paste or using a plating method, or the like. The holes of the unit laminates 110A, 110B, and 110C may be formed by performing a laser processing method, a punching method, or the like, on the ceramic green sheets. Alternatively, the holes of the unit laminates 110A, 110B, and 110C may be formed by processing holes in a laminate after being sintered.

As described above, the pad portions 131 and 132 may be disposed between the unit laminates 110A, 110B, and 110C to electrically connect connection electrodes 121 and 122 between the unit laminates 110A, 100B, and 110C. When stacking the unit laminates 110A, 110B, and 110C to implement the capacitor component 100, the positions of the connection electrodes 121 and 122 may not be aligned, which can deteriorate the electrical properties or cause connection electrodes 121 and 122 to not be electrically connected to each other. According to the present exemplary embodiment, an alignment defect may be decreased by securing electrical connectivity between the connection electrodes 121 and 122 using the pad portions 131 and 132, respectively, such that high capacitance may be stably implemented. The material of the pad portions 131 and 132 is not particularly limited, but may be the same as a material of the internal electrodes 111 and 112, or the like.

The pad portions 131 and 132 may be larger than the connection electrodes 121 and 122 as illustrated in FIG. 4. As the pad portions 131 and 132 are provided between the unit laminates 110A, 110B, and 110C, even when the size of the connection electrode 121, that is, its area as viewed in the stacking direction, is small, as illustrated in FIG. 5, the connection electrode 121 may be stably connected to the pad portion 131. Further, even where the central axes of the respective connection electrodes 121 positioned above and below the pad portion 131 are offset and do not coincide with each other, as illustrated in FIG. 6, or where sizes of the connection electrodes are different from each other, as illustrated in FIG. 7, deterioration of connectivity of the connection electrodes 121 may be significantly decreased. Therefore, in the capacitor component 100 obtained by separately manufacturing and stacking the plurality of unit laminates 110A, 110B, and 110C using the pad portion 131, alignment defects between the unit laminates 110A, 110B, and 110C may be decreased and electrical connectivity and reliability may be improved. Although the first pad portion 131 and the first connection electrode 121 are illustrated in FIGS. 5 through 7, the second pad portion 131 and the second connection electrode 122 may be similarly connected to each other.

Figure 10:
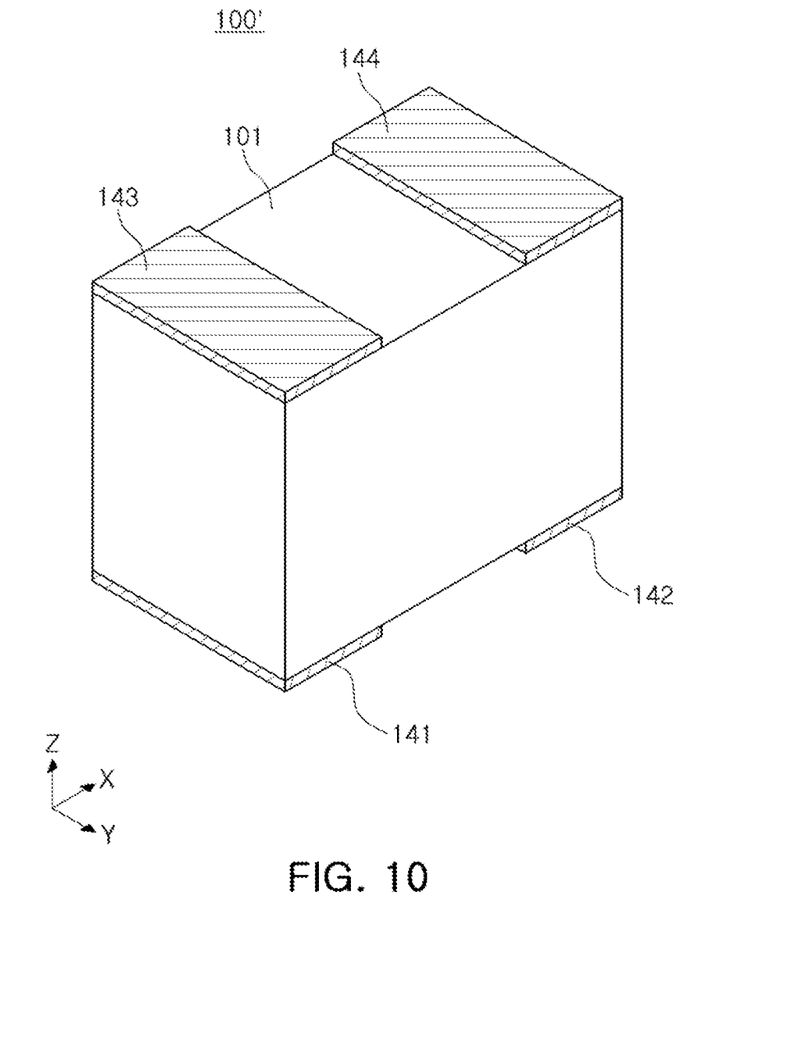
FIG. 10 is a perspective view illustrating a modified example of external electrodes in FIG. 1.

The first and second external electrodes 141 and 142 may be provided as mounting regions at the time of mounting the capacitor component 100 on a circuit board, or the like, and if necessary, the first and second external electrodes 141 and 142 may have a multilayer structure. The first and second external electrodes 141 and 142 may be formed only on a lower surface of the capacitor component 100 and not formed on an upper surface or side surfaces of the capacitor component 100 as in the present exemplary embodiment. However, as shown in capacitor component 100' according to the modified example in FIG. 10, external electrodes 143 and 144 formed on an upper portion of the capacitor component 100' may also be included. Here, the term "upper portion" means an upper surface of a unit laminate disposed in an uppermost position in the capacitor component among the plurality of unit laminates.

Figure 8:
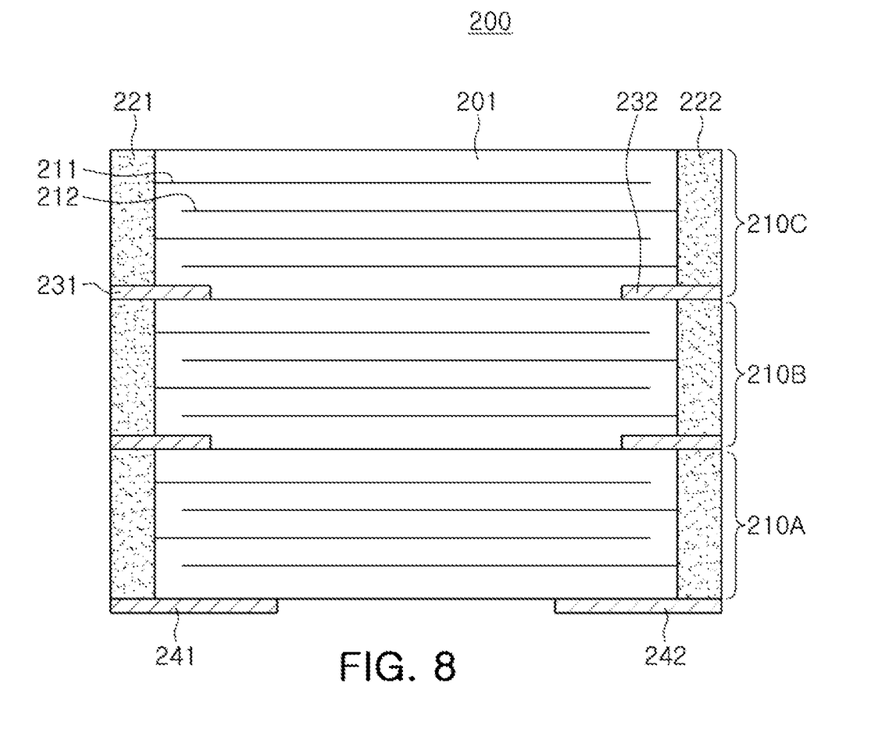
FIG. 8 is a cross-sectional view illustrating a capacitor component according to another exemplary embodiment in the present disclosure.
Figure 9:
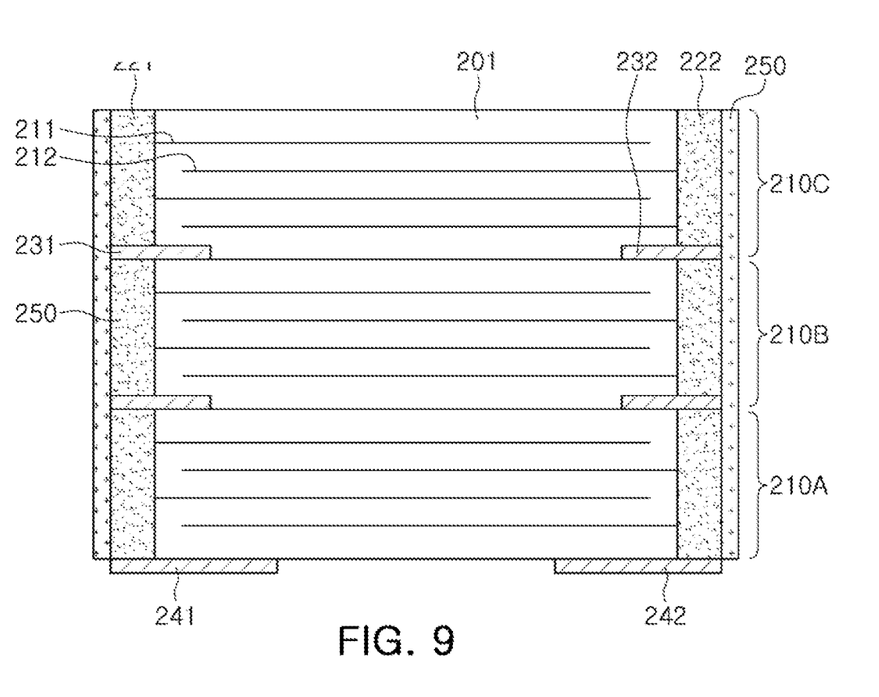
FIG. 9 illustrates a modified example of the capacitor component of FIG. 8.

FIG. 8 is a cross-sectional view illustrating a capacitor component according to another exemplary embodiment in the present disclosure. FIG. 9 illustrates a capacitor component modified in the exemplary embodiment illustrated in FIG. 8.

Referring to FIG. 8, a capacitor component 200 may have a structure in which a plurality of unit laminates 210A, 210B, and 210C are stacked similarly to the exemplary embodiment described above, and pad portions 231 and 232 may be disposed between the unit laminates 210A, 210B, and 210C. First and second external electrodes 241 and 242 may be disposed on a lower portion of the capacitor component 200. The unit laminates 210A, 210B, and 210C may include a body 201, a plurality of internal electrodes 211 and 212 disposed in the body 201, and connection electrodes 221 and 222 that extend in a stacking direction of the body 201 and connect to the plurality of internal electrodes 211 and 212, respectively.

Unlike the previous exemplary embodiment in which the connection electrodes penetrate through the body, in the present exemplary embodiment, the connection electrodes 221 and 222 may be formed on side surfaces of the body 201, such that the connection electrodes 221 and 222 may be exposed externally on the side surface of the body 201. As illustrated in FIG. 8, side surfaces of pad portions 231 and 232 may also be exposed externally. As illustrated in the modified example of FIG. 9, a protective layer 250 may be formed to cover the connection electrodes 221 and 222 and the pad portions 231 and 232 in order to protect the connection electrodes 221 and 222 and the pad portions 231 and 232 and thereby improve reliability of the capacitor component 200. The protective layer 250 may contain a material such as an insulating resin, an insulating ceramic, or the like, and if necessary, a functional filler may be added thereto in order to improve heat radiation performance, or the like.

Figure 11:
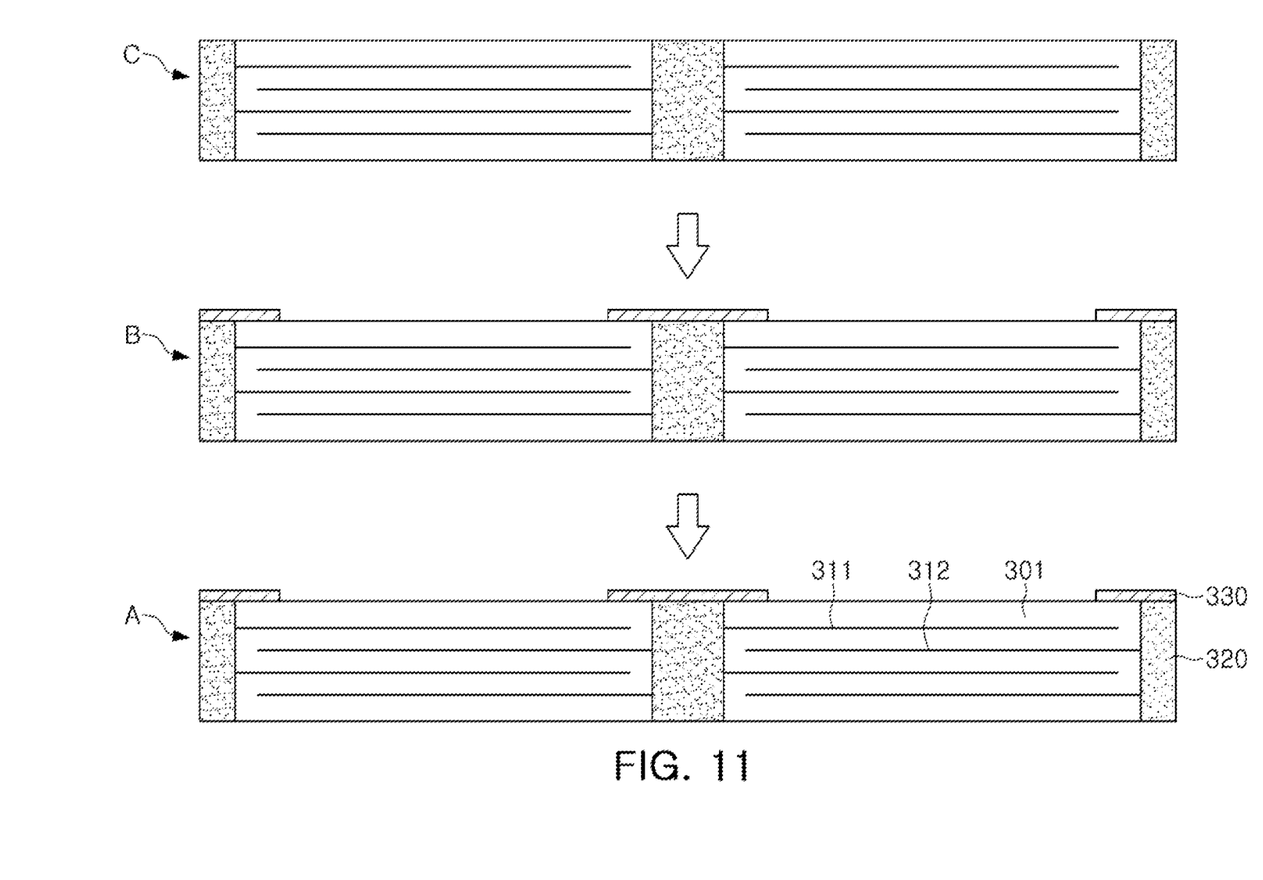
FIGS. 11 and 12 illustrate an example of a manufacturing method of the capacitor component.
Figure 12:
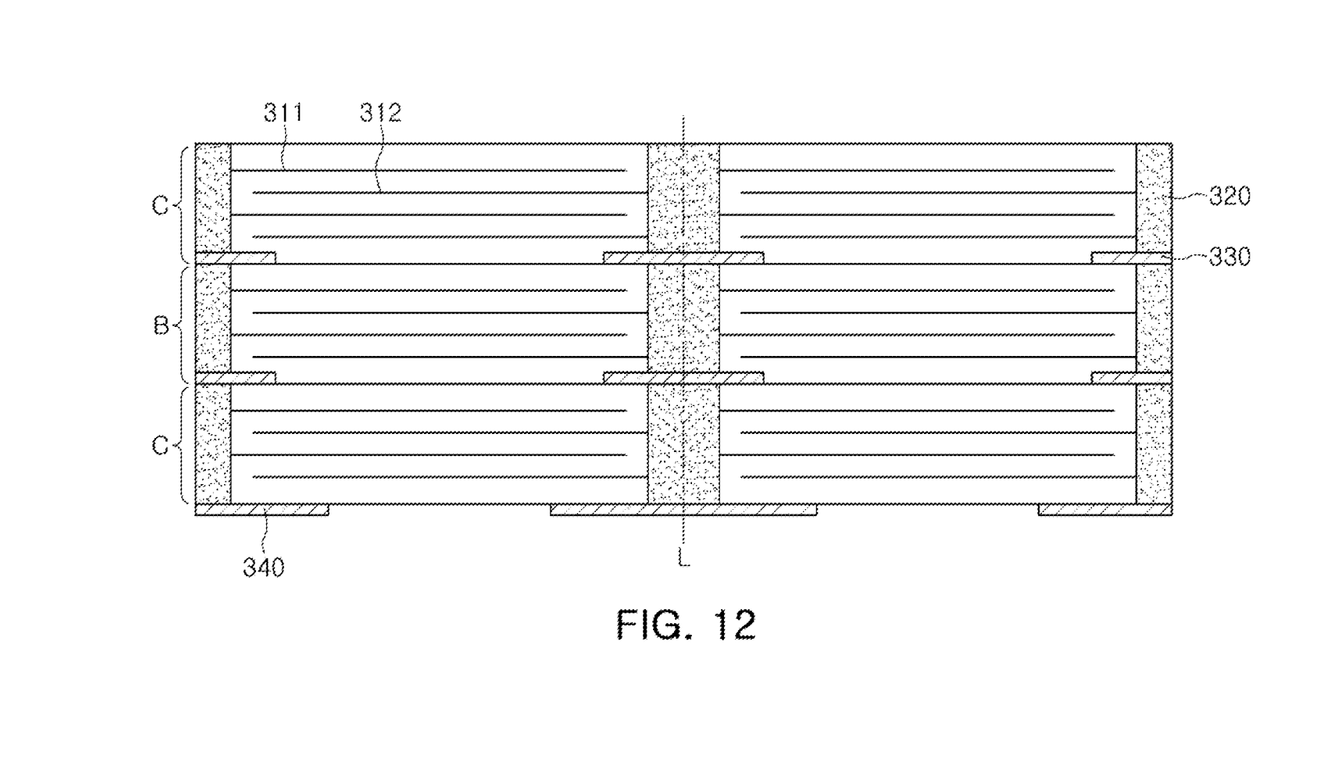

FIGS. 11 and 12 illustrate an example of a manufacturing method of the capacitor component. A structure of the above-mentioned capacitor component will be further clarified by the description of the manufacturing method. The following manufacturing method is based on the capacitor component of FIG. 8, but the capacitor component of FIG. 1 may also be similarly manufactured by applying this method.

Referring to FIGS. 11 and 12, unit laminates A, B, and C may be prepared and stacked, wherein each of the unit laminates A, B, and C may include a body 301, internal electrodes 311 and 312, a connection electrode 320 connected to the internal electrodes 311 and 312, and a pad portion 330. As described above, the number of unit laminates A, B, and C may be adjusted in consideration of capacitance to be required, thickness conditions, and the like.

After stacking the unit laminates A, B, and C, the stacked body may be scribed along a line L illustrated in FIG. 12 to thereby be divided into unit capacitor components. Before or after the scribing, external electrodes 340 may be formed on the lower surface of the lowermost unit laminate, which in this example is unit laminate A.

As set forth above, according to exemplary embodiments in the present disclosure, a capacitor component capable of implementing high capacitance and having excellent electrical connectivity and reliability may be obtained by decreasing the alignment defect between connection electrodes even though the thickness thereof is increased.

While exemplary embodiments have been shown and described above, it will be apparent to those skilled in the art that modifications and variations could be made without departing from the scope of the present invention as defined by the appended claims.

What is claimed is:

1. A capacitor component comprising:
   a plurality of unit laminates, each comprising a body with a stacked structure including a plurality of internal electrodes and connection electrodes that extend in a stacking direction of the body and electrically connect to the plurality of internal electrodes; and
   a pad portion at least partially embedded in the body of one unit laminate of two adjacent unit laminates among the plurality of unit laminates, wherein upper and lower surfaces of the pad portion contact respective connection electrodes of the two adjacent unit laminates, wherein at least one of the upper surface or the lower surface of the pad portion contacts a dielectric layer.

2. The capacitor component of claim 1, wherein the connection electrodes penetrate through the body.

3. The capacitor component of claim 1, wherein an area of the pad portion, as viewed from the stacking direction, is larger than that of the connection electrodes.

4. The capacitor component of claim 1, wherein respective areas of the connection electrodes, as viewed from the stacking direction, positioned above and below the pad portion are different from each other.

5. The capacitor component of claim 1, wherein the connection electrode is at a side surface of the body.

6. The capacitor component of claim 5, wherein a side surface of the pad portion is at the side surface of the body.

7. The capacitor component of claim 6, further comprising a protective layer covering the connection electrode and the pad portion at the side surface of the body.

8. The capacitor component of claim 1, wherein the plurality of internal electrodes includes a plurality of first and second internal electrodes alternately stacked with dielectric layers interposed therebetween.

9. The capacitor component of claim 8, wherein the connection electrodes include first and second connection electrodes electrically connected to the first and second internal electrodes, respectively.

10. The capacitor component of claim 9, wherein the second connection electrode penetrates through the first internal electrode and is not connected to the first internal electrode.

11. The capacitor component of claim 9, wherein the pad portion includes a first pad portion connected to the respective first connection electrodes of the unit laminates positioned above and below the first pad portion.

12. The capacitor component of claim 11, wherein the pad portion includes a second pad portion connected to the respective second connection electrodes of the unit laminates positioned above and below the second pad portion.

13. The capacitor component of claim 9, further comprising first and second external electrodes electrically connected to the first and second connection electrodes, respectively, and formed on a lower surface of a lowermost unit laminate among the plurality of unit laminates.

14. The capacitor component of claim 13, wherein the first and second external electrodes are also formed on an upper surface of an uppermost unit laminate among the plurality of unit laminates.

15. The capacitor component of claim 13, wherein the first and second external electrodes are not formed on side surfaces, in relation to the stacking direction, of the plurality of unit laminates.

16. The capacitor component of claim 1, wherein the plurality of unit laminates includes three or more unit laminates.

17. The capacitor component of claim 1, wherein the pad portion contacts another one unit laminate of the two adjacent unit laminates.

18. The capacitor component of claim 1, wherein the pad portion extends inwardly of at least two intersecting outer surfaces of the body of the unit laminate.

* * * * *